United States Patent [19]

Torii et al.

[11] Patent Number: 4,953,992
[45] Date of Patent: Sep. 4, 1990

[54] INDUSTRIAL ROBOT SWIVEL SHAFT APPARATUS

[75] Inventors: Nobutoshi Torii, Hachioji; Kazuhisa Otsuka, Hino, both of Japan

[73] Assignee: Fanuc Ltd., Yamanashi, Japan

[21] Appl. No.: 210,515

[22] PCT Filed: Nov. 4, 1987

[86] PCT No.: PCT/JP87/00849
 § 371 Date: Apr. 21, 1988
 § 102(e) Date: Apr. 21, 1988

[87] PCT Pub. No.: WO88/03464
 PCT Pub. Date: May 19, 1988

[30] Foreign Application Priority Data

Nov. 13, 1986 [JP] Japan .................. 61-270619

[51] Int. Cl.[5] .................................... F16C 33/78
[52] U.S. Cl. ............................ 384/607; 384/488; 384/619
[58] Field of Search ........... 384/607, 619, 447, 488, 384/480

[56] References Cited

U.S. PATENT DOCUMENTS 3,012,829 12/1961 Marshall ...................... 384/607
4,479,683 10/1984 Kanamaru .................... 384/619

FOREIGN PATENT DOCUMENTS 182792 8/1986 Japan .

Primary Examiner—Lenard A. Footland
Attorney, Agent, or Firm—Staas & Halsey

[57] ABSTRACT

An industrial robot rotation shaft apparatus according to the invention has a waterproof structure obtained by providing the outer surface of a rotatable support (3) with an integrally formed, peripheral skirt portion (3c). A stationary support (2) is provided with a complementary, projecting collar portion (7b) substantially conforming to the inner surface of the skirt portion. The two complementary elements oppose each other while maintaining a small clearance therebetween. This makes it possible to shut out dust, water droplets and the like which would otherwise penetrate the interior of the robot from outside. As a result, rusting of the internal parts and the motor due to water droplets and debris penetrating the same is prevented.

3 Claims, 2 Drawing Sheets

FIG. 1
FIG. 2
FIG. 3
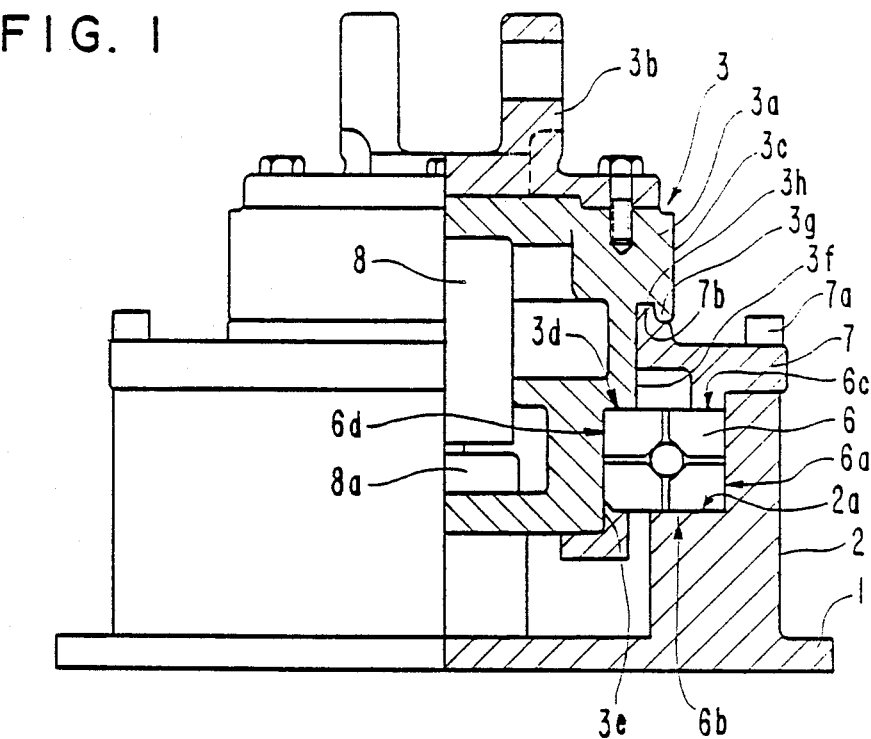
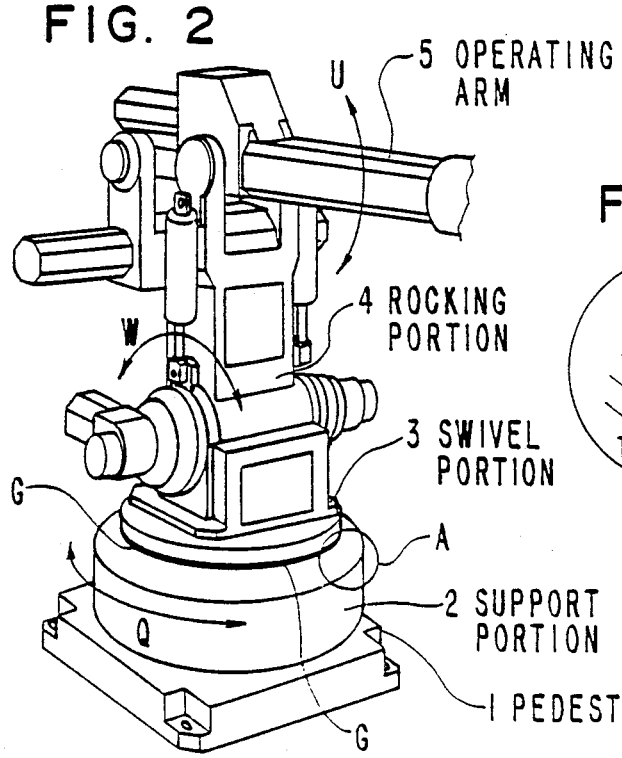

INDUSTRIAL ROBOT SWIVEL SHAFT APPARATUS

BACKGROUND OF THE INVENTION

1. Field of the Invention

This invention relates to an industrial robot rotation shaft apparatus in which the rotation shaft of an industrial robot is adapted to be rotated by drive means installed therein.

2. Description of the Related Art

An industrial robot is either secured to a floor surface, or wall surface or provided on a pedestal movable along a floor surface or wall surface. FIG. 2 is a perspective view illustrating an example of an articulated industrial robot having a pedestal secured to a floor surface.

In FIG. 2, numeral 1 denotes a pedestal secured to a floor surface or the like at a predetermined location. A stationary support 2 is provided on the upper surface of the pedestal 1. A rotatable support 3 rotatable through a predetermined rotational angle $\theta$, and is rotatably mounted on the upper part of the stationary support 2. Rotatable support 3 and stationary support 2 together constitute a vertical rotation shaft. A pivot arm 4 having working arm 5 at its upper part is mounted on the rotatable support 3 and is capable of pivoting through pivot shaft 9 at a predetermined angle W about a substantially horizontal pivot axis. A wrist portion (not shown) is provided at the distal end of the working arm 5 and is movable upwardly and downwardly in response to pivotal movement of working arm 5 through a predetermined angle U relative to the pivot shaft 4.

FIG. 3 is a detailed, sectional view of a portion of the joint between the stationary support 2 and the rotatable support 3 indicated by the letter "A" in FIG. 2. As seen in FIG. 3, the rotatable support 3 rests on the upper part of the stationary support 2 and rotates by virtue of a crossed roller bearing 6. When the rotatable support 3 is rotatively driven by a driving force from a drive unit (not shown) the rotatable support 3 turns smoothly on the upper part of the stationary support 2 by means of the crossed roller bearing 6.

Since industrial robots are used, for example, to supply a machine tool with workpieces, minute machining scraps, machining fluids and the like which scatter during machining enter through a circumferential gap G, and directly penetrate a peripheral portion between the rotatable support 3 and stationary support 2, as shown in FIG. 3. Minute particles of foreign matter clinging to the robot or drops of water also tend to penetrate through the gap G when the industrial robot is washed or when the location at which the robot is installed is cleaned. Moisture and foreign matter that have penetrated the interior of the support portion 2 impede the operation of the crossed roller bearing 6 and impair an accurate rotating operation.

Furthermore, if a large amount of water should happen to enter through the gap G, the internal mechanism of the stationary support 2 may rust, causing the rotation drive means installed therein to malfunction.

SUMMARY OF THE INVENTION

The present invention solves the foregoing problems by providing an industrial robot rotation shaft apparatus in which water is prevented from penetrating to the interior through a gap between complementary stationary and rotating portions of the industrial robot.

In accordance with the present invention, there is provided an industrial robot rotation shaft apparatus having a stationary support portion for supporting an industrial robot, a rotatable support portion supported by the stationary support portion for rotation thereon, and bearing means interposed between the stationary support portion and the rotatable support portion. An upstanding portion is formed in a passage, which is directed from the outer side of a gap between the stationary support and the rotatable support to the inner side thereof, by a skirt portion formed integrally with and extending downwardly from an outer circumferential surface of the rotatable support and a collar portion projectingly disposed at an inner surface of the skirt portion so as to conform thereto. Thus, is prevented from penetrating the gap.

Thus, in the industrial robot rotation shaft apparatus of the present invention, a rotation-side member having the depending skirt portion and a stationary-side member having the collar portion corresponding to the shape of the inner surface of the skirt portion are made to oppose each other at the gap formed between the swivel shaft and the support portion at the periphery thereof, and a vertical passage portion is provided to form a waterproof structure. Thus, dust, water droplets and the like will not penetrate the interior of the apparatus from the outside.

BRIEF DESCRIPTION OF THE DRAWINGS

FIG. 1 is a side elevational view, partially cut away, illustrating a preferred embodiment of the present invention;

FIG. 2 is a perspective view illustrating an example of a known articulated industrial robot having a pedestal secured to a floor surface; and FIG. 3 is a detailed, partial sectional view illustrating a portion of FIG. 2.

DETAILED DESCRIPTION OF THE PREFERRED EMBODIMENTS

An embodiment of the present invention will now be described in detail with reference to the drawings.

FIG. 1 is a side view, partially cut away, illustrating an embodiment of the present invention, in which portions identical with those shown in FIGS. 2 and 3 are designated by like reference characters.

In FIG. 1, the outer circumferential surface 6a and the bottom surface 6b of the crossed roller bearing 6 are fitted into a stepped portion 2a formed circumferentially on the inner side of the stationary support 2. The bearing 6 is fixedly secured to the support portion 2 by a holder 7 tightened by a holder screw 7a located near the circumference of the upper surface 6c of the bearing 6.

As seen in FIG. 1, lower portion 3b of pivot shaft 9 which supports the pivot arm (not shown in FIG. 1) at the upper end thereof is attached to a table 3a of the rotatable support 3. A motor 8 serves as a source of power for rotatively driving the rotatable support 3, and is attached to the center of the table 3a via a speed reducer 8a. The table 3a has a lower circumferential surface formed to include an engaging stepped portion 3d which engages the inner peripheral surface 6d and the upper surface 6c of the crossed roller bearing 6, and is placed on the crossed roller bearing 6. Due to the action of the crossed roller bearing 6, the rotatable support 3 is supported on the stationary support 2 and thus turns smoothly in the θ rotational direction.

The peripheral portion of the table 3a above the portion where it engages the crossed roller bearing 6 is provided with a downwardly extending skirt portion 3c. The innermost peripheral portion of the holder 7 is provided with an upwardly projecting collar portion 7b. An upstanding portion is formed in a passageway directed from the outer side to the inner side of a gap between the skirt portion 3c and collar portion 7b. The gap is maintained at a predetermined minute clearance so that the skirt portion 3c and collar portion 7b will not contact each other when the rotatable support 3 turns.

It can be seen from FIG. 1 that the rotatable portion 3 includes a lower, outer first diameter portion 3e, a middle, outer second diameter portion 3f, and an upper, outer third diameter portion 3g. The stepped portion 3d is formed at the transition between the first diameter portion 3e and the second diameter portion 3f, while the skirt portion 3e is formed by an annular groove 3h which extends upwardly between the second diameter portion 3f and the third diameter portion 3g.

The operation of the present embodiment will now be described. A driving force from the motor 8 is transmitted to the rotatable support 3 via the speed reducer 8a, thereby turning the same. Since the table 3a is placed on the inner peripheral portion of the crossed roller bearing 6, the table turns smoothly on the stationary support 2. During this rotation, the small clearance is maintained between the skirt portion 3c provided on the table 3a and the collar portion 7b provided on the holder 7 so that the table 3a may be driven smoothly without contact between the skirt portion and collar portion.

When the industrial robot is washed or the floor surface at the site of installation is cleaned, dust or water droplets will be shut out from the interior of the apparatus since the clearance between the skirt portion 3c and collar portion 7b is small and the vertical gap has the upstanding portion directed from the outer side to the inner side.

Though the embodiment of the present invention has been described for a case where the robot is installed on a floor surface, the invention is not limited to this arrangement, for the robot can be installed on a wall surface or on an inclined mounting surface. The present invention can be modified in various ways without departing from the scope of the claims.

The industrial robot rotation shaft apparatus of the present invention can be applied to a robot which has a rotation shaft and which is secured to a floor or wall surface, or to an articulated or cylindrical coordinate-type robot provided on a pedestal movable along a floor surface or wall surface.

We claim:

1. An industrial robot rotation shaft apparatus comprising:
   a stationary support having an upper end and a lower end for supporting an industrial robot,
   a rotatable support rotatably connected to the stationary support for rotating thereon with a gap formed therebetween,
   bearing means coupled to the stationary support and the rotatable support in the gap therebetween to facilitate rotation of the rotatable support relative to the stationary support,
   said rotatable support having an outer cylindrical surface and a skirt portion extending downwardly from the outer cylindrical surface towards the stationary support; and
   a holder connected to the upper end of the stationary support for holding the bearing means to the stationary support and having a collar portion formed inwardly of the skirt portion and projecting upwardly from the holder, the collar portion being disposed in a complementary, sealing relationship with the skirt portion,
   wherein the rotatable support has a lower, first outer diameter portion, a middle, second outer diameter portion, and a third, upper outer diameter portion, the skirt portion being formed by an annular groove which extends upwardly between the second and third diameter portions, the bearing means supporting the rotatable support at a shoulder formed between the first and second diameter portions, and the collar portion of the holder fitting into the annular groove of the rotatable support so as to overlap with the skirt portion.

2. An industrial robot rotation shaft apparatus according to claim 1, wherein said bearing means is a crossed roller bearing.

3. An industrial robot rotation shaft apparatus according to claim 1, further comprising:
   drive means, provided in said stationary support, for rotatively driving said rotatable support.

* * * * *